United States Patent [19]

Conn et al.

[11] 4,324,772

[45] Apr. 13, 1982

[54] PROCESS FOR PRODUCING HYDROXYAPATITE

[75] Inventors: James F. Conn; Leofwin A. Jessen, both of St. Louis, Mo.

[73] Assignee: Monsanto Company, St. Louis, Mo.

[21] Appl. No.: 208,224

[22] Filed: Nov. 19, 1980

[51] Int. Cl.³ .............................................. C01B 25/32
[52] U.S. Cl. ..................................... 423/309; 423/311
[58] Field of Search ................................ 423/309, 311

[56] References Cited

U.S. PATENT DOCUMENTS

| 3,387,925 | 6/1968 | Vanstrom et al. | 23/109 |
| 3,409,394 | 11/1968 | Sprigg | 423/309 |
| 4,139,599 | 2/1979 | Tomlinson et al. | 423/308 |

*Primary Examiner*—O. R. Vertiz
*Assistant Examiner*—Wayne A. Langel
*Attorney, Agent, or Firm*—Robert E. Wexler

[57] ABSTRACT

A continuous process for producing hydroxyapatite which comprises a two-stage reaction in which pH control and reactant flow are carefully regulated.

10 Claims, No Drawings

PROCESS FOR PRODUCING HYDROXYAPATITE

BACKGROUND OF THE INVENTION

This invention relates to the production of hydroxyapatite.

The batch preparation of TCP by the reaction of lime and phosphoric acid is well known. Due to the inherent nature of batch reaction, however, the volume of TCP produced thereby is necessarily less than could be produced by a continuous process. For example, U.S. Pat. No. 3,387,925 discloses a batch reaction of lime and phosphoric acid wherein the particle size of the TCP is controlled in order to obtain a precipitate of fine particles. In accordance with the invention of the aforementioned patent, it was found that a smaller particle size may be produced by controlling the final pH, the reaction temperature and the rate of addition of the reactants. Thus, the temperature of the reaction is kept within a range of from about 20° to 50° C., the lime slurry is continuously agitated to prevent localized acid build-up and the 20% aqueous phosphoric acid which is used is added to the lime slurry as quickly as possible until the lime slurry is neutralized to a pH of between about 6.7 and 8.5.

SUMMARY OF THE INVENTION

In accordance with the present invention, there is disclosed a process for producing hydroxyapatite in large volumes which comprises continuously charging to the first stage of a two-stage reactor a slurry of calcium oxide in water and a solution of phosphoric acid in water. The lime slurry and the solution of phosphoric acid in water are then allowed to react in the first stage under vigorous agitation at a pH such that the viscosity of the reaction mass is near minimum viscosity, i.e. a pH of from about 9.5 to about 11. The reaction is then continued in the second stage of the reactor under vigorous agitation while continuously charging additional solution of aqueous phosphoric acid in an amount sufficient to maintain the pH in the second stage at about 7.0 to about 7.4. The hydroxyapatite reactant product is continuously removed from the reactor.

SPECIFIC EMBODIMENTS OF THE INVENTION

The primary reaction of the present invention is as follows:

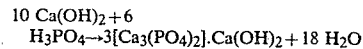

This reaction gives a 100% yield of product.

The reaction is conducted in a two-stage reactor wherein the rate of flow of phosphoric acid and lime slurry is adjusted so that from about 70 to about 94% of the lime slurry is converted in the first stage and the remaining portion is converted in the second stage. It is preferred that approximately 90% of the reaction be completed in the first stage for best quality product. Above about 94% completion of reaction in the first stage affords a product which is unsatisfactory because of high bulk density.

When phosphoric acid is added to lime slurry at a pH above about 7, hydroxyapatite precipitates as a solid phase. In order to precipitate hydroxyapatite with low bulk density and high surface area, the precipitation must be carried out at a pH above about 10. Accordingly, a two-stage reactor is required to produce hydroxyapatite on a continuous basis. Both stages must have vigorous agitation. The phosphoric acid is added in the first stage in a manner suitable to disperse the acid so that high local concentrations of acid are avoided.

The major process variables are (1) the lime/acid ratio, (2) pH and (3) agitation. The rates of acid flow and lime flow must be adjusted such that about 90% of the lime is converted to hydroxyapatite in the first stage and the remaining 10% is converted in the second stage. The ratio is controlled indirectly by avoiding high local acid concentration or high local lime concentration.

Control of pH is vital to the successful control of the process. It is important to hold the pH in stage one between about 9.5 to about 11. A pH of 9.5–10 indicates that the reaction in stage one is approaching 100% and the viscosity of the reaction mass approaches a maximum where agitation becomes less efficient. A pH above about 11 indicates that the extent of reaction is too low in stage one. Deviation from a pH of from about 9.5 to about 11, preferably from about 10 to about 11 and, more preferably, at about 10.5 indicates that either acid or lime flow is not correct and must be adjusted. Phosphoric acid delivery to the second stage is controlled in such a manner as to hold the pH at about 7.0 to about 7.4, preferably from about 7.2 to about 7.3. It is important to have accurate pH control at this point to produce quality product.

The most critical variable in the process is agitation. Agitation in both stages is very difficult because of the high viscosity of the slurry. Excellent agitation is required in the first stage to form a quality product. Poor agitation in the first stage affords an overflow product to the second stage containing entrapped, unreacted lime which cannot be reacted in the second stage. This causes the pH of the dried final product to go up to pH 8–9 when reslurried in water. Alternately, high local concentrations of phosphoric acid must be avoided to prevent the formation of dicalcium phosphate which is impossible to convert to the desired hydroxyapatite. Efficient agitation is very important in the second stage to obtain equilibrium so that the pH of the final product slurry will not drift. The viscosity in the second stage is higher than it is in the first stage and thus more efficient agitation is necessary. Insufficient agitation will result in a rapid, wide change in pH as unmixed portions of different pH are carried through the process.

The temperature at which the reaction is carried out has little effect on the product quality or on the efficiency of the process. Accordingly, temperatures from 35° to 90° C. are satisfactory.

EXAMPLE

To a two-stage reactor having a 26.5 l. stainless steel first stage and a glass lined 79.5 l. second stage equipped with acid and lime feed lines, an overflow trough from the first stage to the second stage, product outlet in the second stage and high efficiency agitators, was added lime slurry (30% suspension in water) and 80% phosphoric acid at a rate such that 31.3 kg. of lime and 70.8 kg. of acid were added per hour. The flow rate provided an acid/lime ratio such that 90% reaction at a temperature of about 70°–85° C. occurred in the first stage. A pH of about 10.5 was held in the first stage by means of flow controllers coupled to pH probes. After 15 min., the suspension overflowed to the second stage where phosphoric acid (80%) was automatically fed by means of flow controllers coupled to pH probes which were calibrated to maintain a pH of about 7.2–7.4. After 45 min. in the second stage, a 30% suspension of hydroxyapatite in water overflowed to a flash dryer. The suspension was flash-dried to produce 45.4 kg./hr. of submicron, powdered hydroxyapatite.

We claim:

1. A process for producing hydroxyapatite comprising continuously charging to the first stage of a two-stage reactor a slurry of calcium oxide in water and a solution of phosphoric acid in water, allowing said slurry and said solution to react in said first stage under vigorous agitation at a pH such that the viscosity of the reaction mass is near minimum viscosity, continuing said reaction in the second stage of said reactor under vigorous agitation while continuously charging additional solution of aqueous phosphoric acid thereto in an amount sufficient to maintain the pH in said second stage at about 7.0 to about 7.4 and continuously removing a suspension of hydroxyapatite from said second stage.

2. Process of claim 1 wherein said first stage reaction is conducted at a pH of from about 9.5 to about 11.

3. Process of claim 2 wherein said first stage reaction is conducted at a pH of about 10.5.

4. Process of claim 1 wherein said second stage reaction is conducted at a pH of from about 7.2 to about 7.3.

5. Process of claim 2 wherein said second stage reaction is conducted at a pH of from about 7.2 to about 7.3.

6. Process of claim 3 wherein said second stage reaction is conducted at a pH of from about 7.2 to about 7.3.

7. Process of claim 1 wherein the rate of charging of said phosphoric acid solution and said lime slurry is maintained at a ratio such that from about 70 to about 94 percent of said slurry is converted to hydroxyapatite in said first stage and from about 6 to about 30 percent of said slurry is converted in said second stage.

8. Process of claim 7 wherein said ratio is maintained such that about 90 percent of said slurry is converted to hydroxyapatite in said first stage and about 10 percent of said slurry is converted in said second stage.

9. Process of claim 1 wherein said reaction is carried out at a temperature of from about 35° to about 90° C.

10. Process of claim 1 wherein said suspension of hydroxyapatite is flash-dried to afford submicron, powdered hydroxyapatite.

* * * * *

UNITED STATES PATENT AND TRADEMARK OFFICE
CERTIFICATE OF CORRECTION

PATENT NO. : 4,324,772
DATED : April 13, 1982
INVENTOR(S) : James F. Conn and Leofwin A. Jessen It is certified that error appears in the above-identified patent and that said Letters Patent are hereby corrected as shown below:

Column 2, Line 54, "To a two-stage reactor having a 26.51. stainless steel" should read --To a two-stage reactor having a 26.5 1. stainless steel--.

Column 2, Line 55, "first stage and a glass lined 79.51. second stage equipped" should read --first stage and a glass lined 79.5 1. second stage equipped--.

Signed and Sealed this

Twentieth Day of July 1982

[SEAL]

Attest:

GERALD J. MOSSINGHOFF

Attesting Officer

Commissioner of Patents and Trademarks